US012196843B2

(12) United States Patent
Ma et al.

(10) Patent No.: US 12,196,843 B2
(45) Date of Patent: Jan. 14, 2025

(54) METHODS AND SYSTEMS FOR RADAR WAVEFORM DIVERSITY

(71) Applicant: Waymo LLC, Mountain View, CA (US)

(72) Inventors: Philip Ma, Hawthorne, CA (US); Filip Perich, Santa Clara, CA (US); Aravind Ramachandran, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 321 days.

(21) Appl. No.: 17/804,240

(22) Filed: May 26, 2022

(65) Prior Publication Data
US 2023/0393256 A1    Dec. 7, 2023

(51) Int. Cl.
  *G01S 13/32*       (2006.01)
  *G01S 7/02*        (2006.01)
  *G01S 13/931*      (2020.01)

(52) U.S. Cl.
  CPC .......... *G01S 13/325* (2013.01); *G01S 7/0234* (2021.05); *G01S 13/931* (2013.01); *G01S 2013/93273* (2020.01)

(58) Field of Classification Search
  None
  See application file for complete search history.

(56) References Cited

U.S. PATENT DOCUMENTS

| 6,185,246 | B1 | 2/2001 | Gilhausen |
| 9,841,498 | B1* | 12/2017 | Campbell ............... G01S 7/023 |
| 10,018,715 | B2 | 7/2018 | Steinhauer |
| 10,048,353 | B2 | 8/2018 | Vogt |

(Continued)

FOREIGN PATENT DOCUMENTS

| EP | 3671267 A1 | 6/2020 | |
| JP | 2020-126008 A | * 8/2020 | ............. G01S 13/91 |

(Continued)

OTHER PUBLICATIONS

"Who We Are: Our Brands"; publication of the Wi-Fi Alliance; Austin, TX, USA; posted on the internet at www.wi-fi.org; no author listed; copyright in the year 2024. (Year: 2024).*

(Continued)

*Primary Examiner* — Bernarr E Gregory
(74) *Attorney, Agent, or Firm* — McDonnell Boehnen Hulbert & Berghoff LLP

(57) ABSTRACT

Example embodiments relate to techniques for implementing radar waveform diversity. A technique may involve a radar unit transmitting radar signals into an environment of a vehicle based on a code sequence that indicates a ramp direction and a phase shift for each pulse in a pulse used by the radar unit and receiving radar reflections from the environment. In some instances, the radar unit may leverage antennas in a multiple input multiple output (MIMO) arrangement to further add diversity to transmissions according to spatial code in the code sequence. The technique can further involve using a demodulator to map the environment based on the radar reflections and controlling the vehicle based on the mapping. In some instances, the code sequence is received from a system that is wirelessly providing orthogonal code sequences to multiple emitters.

20 Claims, 15 Drawing Sheets

(56) References Cited

U.S. PATENT DOCUMENTS

| | | | |
|---|---|---|---|
| 10,404,261 B1 | 9/2019 | Josefberg | |
| 10,676,085 B2 | 6/2020 | Smith | |
| 10,855,328 B1* | 12/2020 | Gulati | G01S 7/0234 |
| 11,002,829 B2* | 5/2021 | Hung | G01S 13/931 |
| 11,237,245 B2 | 2/2022 | McCloskey | |
| 11,280,876 B2 | 3/2022 | Gultai | |
| 11,280,879 B2 | 3/2022 | Hong | |
| 2016/0223644 A1 | 8/2016 | Soga | |
| 2017/0219689 A1 | 8/2017 | Hung et al. | |
| 2019/0235050 A1 | 8/2019 | Maligeorgos | |
| 2019/0383925 A1* | 12/2019 | Gulati | G01S 13/325 |
| 2021/0096234 A1* | 4/2021 | Gulati | G01S 13/325 |
| 2021/0270951 A1 | 9/2021 | Yoshizawa | |
| 2022/0206132 A1* | 6/2022 | Bialer | G01S 13/931 |

FOREIGN PATENT DOCUMENTS

| | | | |
|---|---|---|---|
| WO | 2018198453 A1 | 11/2018 | |
| WO | 2019245703 A1 | 12/2019 | |
| WO | 2020005424 A1 | 1/2020 | |
| WO | 2022072487 A1 | 4/2022 | |

OTHER PUBLICATIONS

Sun et al., "MMO Radar and Advanced Driver-Assistance Systems and Autonomous Driving", IEEE Signal Processing Magazine, pp. 98-117 (2020).

Uysal, "Phase-Coded FMCW Automotive Radar: System Design and Interfeence Mitigation", IEEE Transaction on Vehicular Technology, 69(1):270-281 (2020).

\* cited by examiner

METHODS AND SYSTEMS FOR RADAR WAVEFORM DIVERSITY

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for implementing radar waveform diversity. Radar waveform diversity can be implemented by transmitting signals according to a code sequence with pulse-to-pulse variations, which can involve adjustments of the ramp direction, the phase, and/or the spatial code of each pulse. By transmitting radio frequency (RF) signals with diverse waveforms, a radar system or another type of processing system can differentiate desired reflections of the transmitted signals from the electromagnetic energy propagating in the environment from other emitters, such as other vehicle radar systems. In some cases, a planning system may generate and distribute a different code sequence to each vehicle within a network. With each vehicle radar system operating according to a unique code sequence received from the planning system, interference between the radar systems is further mitigated.

In one aspect, an example method is provided. The method involves causing, by a computing device positioned on a vehicle, a radar unit to transmit radar signals into an environment based on a code sequence. The code sequence indicates a ramp direction and a phase shift for each pulse in a pulse chain used by the radar unit for radar signal transmission. The method also involves receiving, by the computing device, radar reflections from the environment, mapping, by the computing device using a demodulator, the environment based on the radar reflections, and controlling the vehicle based on mapping the environment.

In another aspect, an example system is provided. The system includes a radar unit coupled to a vehicle and a computing device. The computing device is configured to cause the radar unit to transmit radar signals into an environment based on a code sequence. The code sequence indicates a ramp direction and a phase shift for each pulse in a pulse chain used by the radar unit for radar signal transmission. The computing device is further configured to receive radar reflections from the environment, map, using a demodulator, the environment based on the radar reflections, and control the vehicle based on mapping the environment.

In yet another example, an example non-transitory computer-readable medium is provided. The non-transitory computer-readable medium is configured to store instructions, that when executed by a computing system comprising one or more processors, causes the computing system to perform operations. The operations involve causing a radar unit to transmit radar signals into an environment of a vehicle based on a code sequence. The code sequence indicates a ramp direction and a phase shift for each pulse in a pulse chain used by the radar unit for radar signal transmission. The operations further involve receiving radar reflections from the environment, mapping, using a demodulator, the environment based on the radar reflections, and controlling the vehicle based on mapping the environment.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
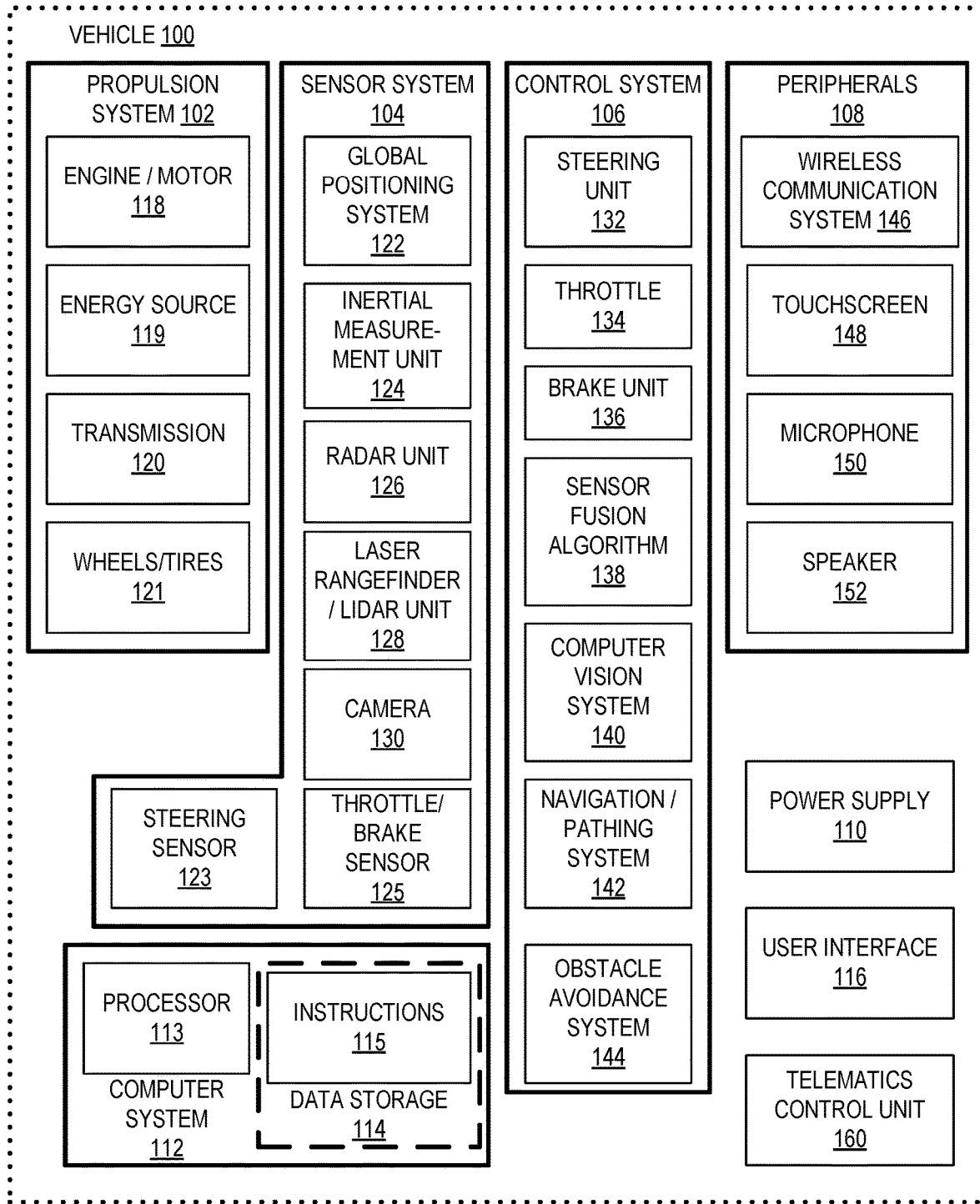
FIG. 1 is a functional block diagram illustrating a vehicle, according to one or more example embodiments.
Figure 2A:
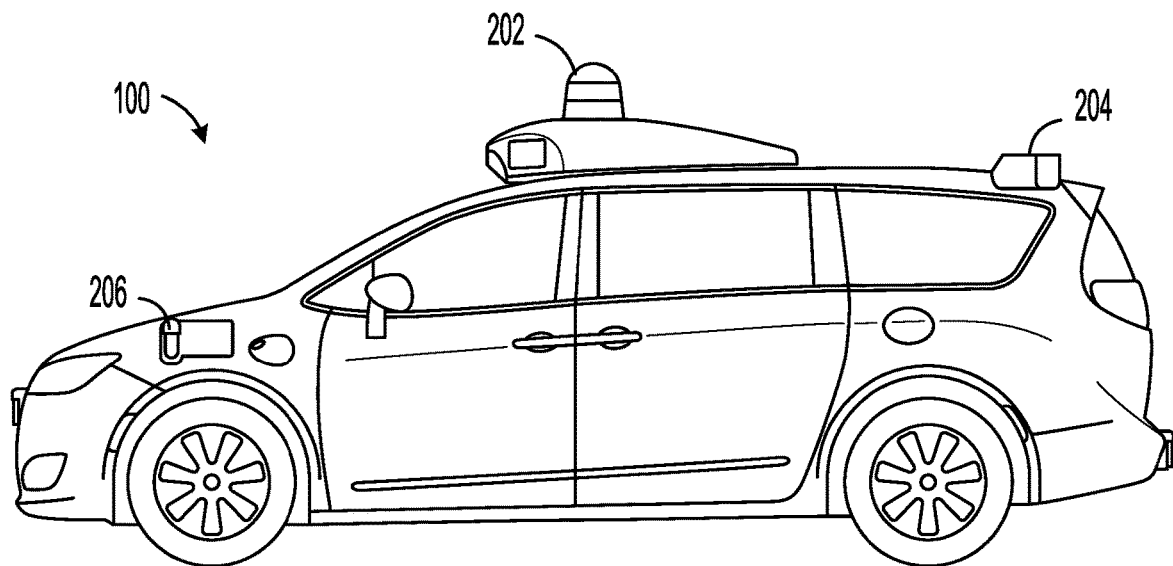
FIG. 2A illustrates a side view of a vehicle, according to one or more example embodiments.
Figure 2B:
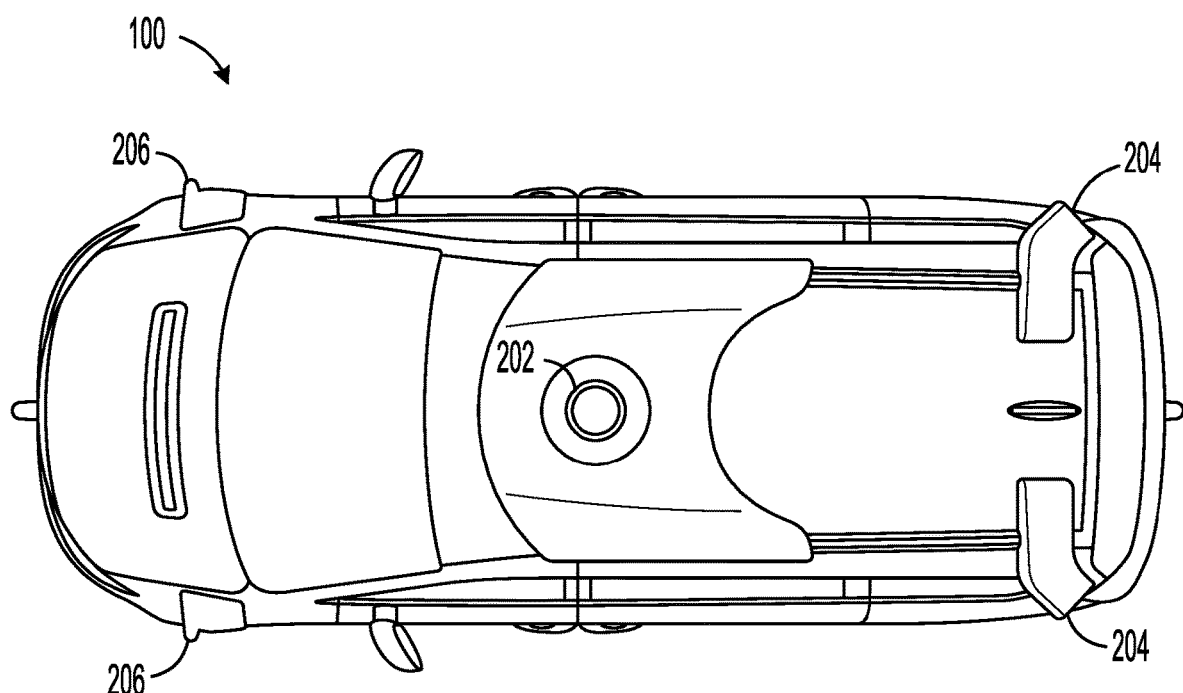
FIG. 2B illustrates a top view of a vehicle, according to one or more example embodiments.
Figure 2C:
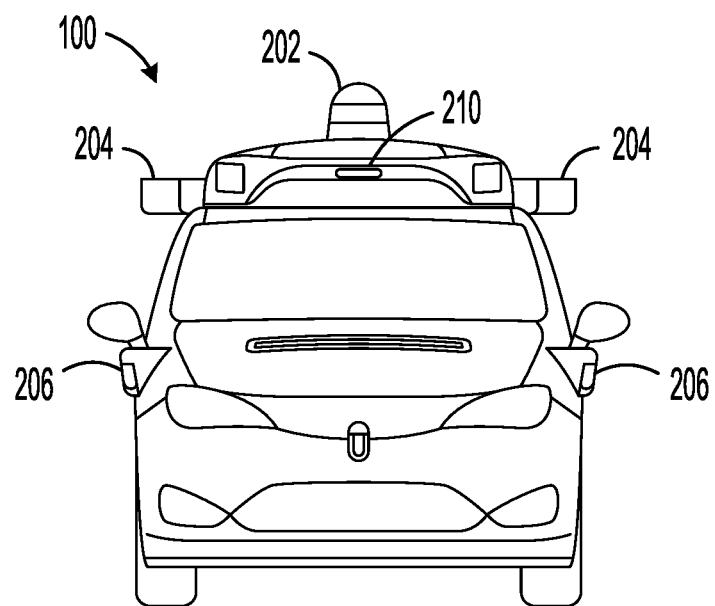
FIG. 2C illustrates a front view of a vehicle, according to one or more example embodiments.
Figure 2D:
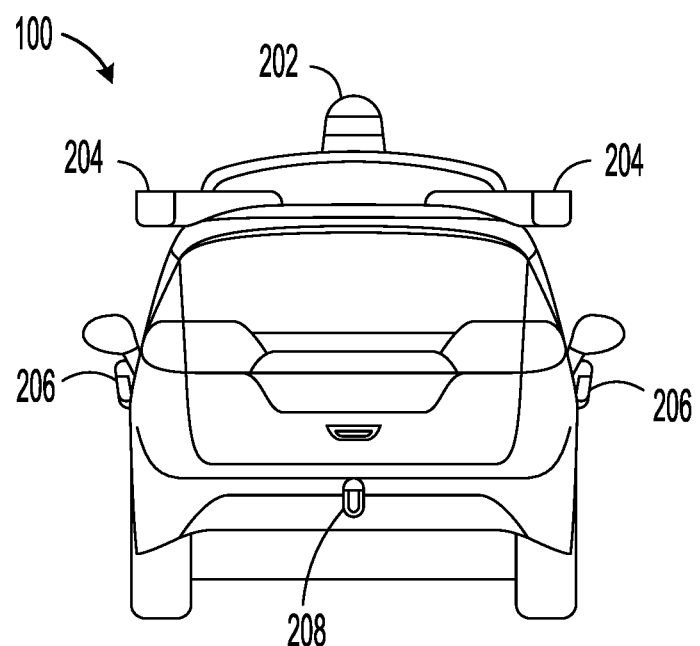
FIG. 2D illustrates a back view of a vehicle, according to one or more example embodiments.
Figure 2E:
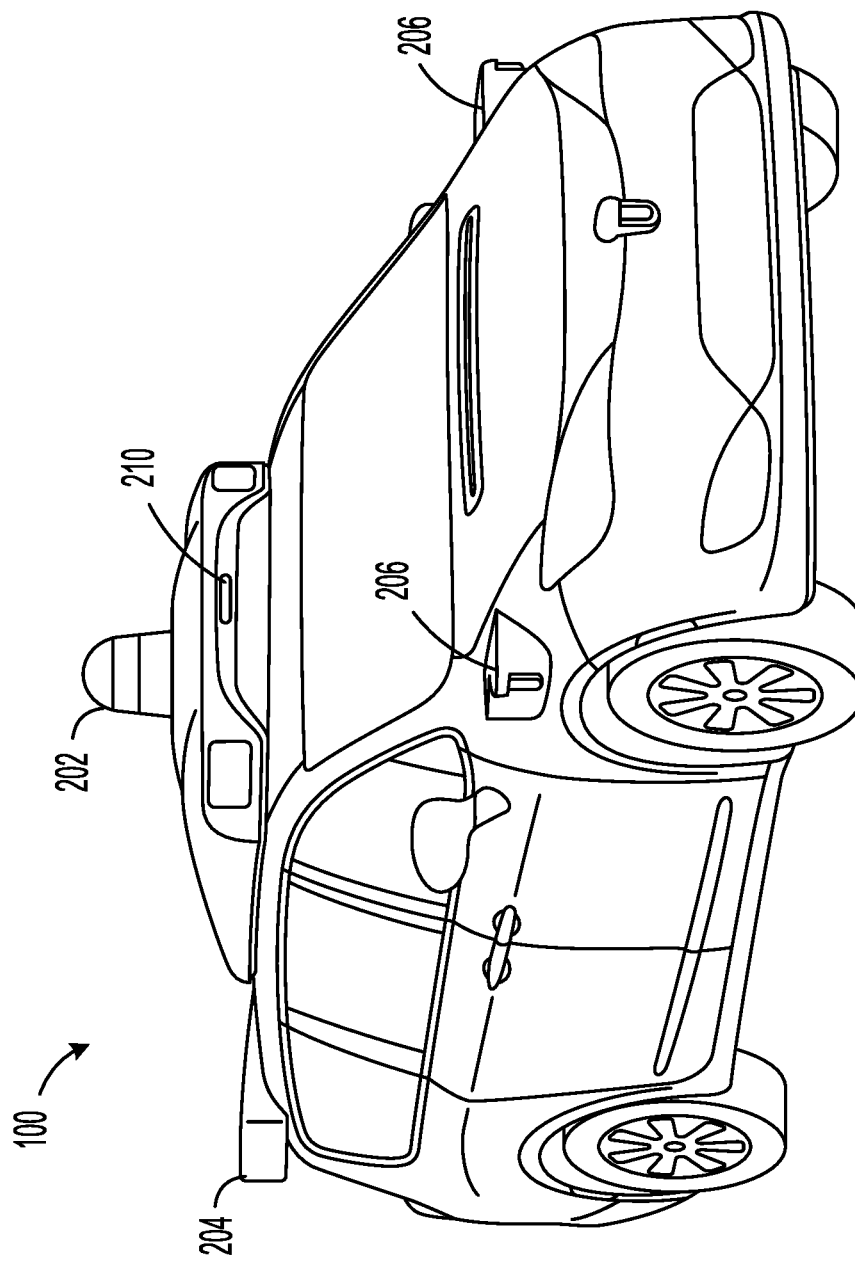
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can detect objects by transmitting electromagnetic signals (radar signals) and analyzing the backscattered signals from the objects and other surfaces in the environment. The system can detect an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit. The received reflections can be used by a radar processing system (e.g., a computing device) to generate two dimensional (2D) and/or three dimensional (3D) measurements that represent measurements of the environment, such as the positions, orientations, and movements of nearby objects and other surfaces occupying the environment near the radar system. Radar can provide range data, Doppler data, azimuth data, and/or elevation data for objects and surfaces in the surrounding environment.

Vehicles are increasingly incorporating radar systems for obstacle detection and avoidance and to measure other aspects of dynamic environments, such as road conditions. Some vehicle radar systems are designed to operate within an automotive band (e.g., within 5 Gigahertz (GHz) of a spectral region that extends between 76 GHz and 81 GHz, inclusive). Although the spectral region can offer plenty of bandwidth to accommodate a single vehicle radar system (e.g., 5 GHz), interference can arise and cause issues when multiple vehicle radar systems are operating on the same frequency or similar frequencies in the same general location. Interference can make it difficult to differentiate between desired reflections of transmitted signals and other RF signals that originate from nearby emitters, which can decrease a vehicle radar system's ability to measure aspects of the surrounding environment. With more vehicles incorporating radar, vehicle radar systems are increasingly likely to encounter RF interference during navigation, especially within city limits and other areas that typically have more vehicles navigating in multiple directions. Thus, there clearly exists a need to enable radar systems to mitigate interference that can arise when multiple emitters are operating in the same general location.

Example embodiments presented herein relate to radar waveform diversity techniques that can allow vehicle radar systems and other types of emitters to mitigate interference thereby enhancing performance within RF-dense environments. Disclosed techniques to transmit signals with diverse waveforms, which may vary on a pulse-to-pulse basis. For instance, each pulse within a pulse chain used by the emitter can differ in one or more transmission parameters, such as ramp direction, phase shift, and spatial code. The diverse properties of the transmitted signals can enable the signal processor to distinguish desired reflections from other RF propagating in the environment. In particular, the signal processor can process and filter received signals based on the code sequence used to generate the diverse waveforms. As such, disclosed radar waveform diversity techniques can be used herein to minimize the impact of RF interference.

By way of an example, a vehicle radar unit may emit signals into an environment of a vehicle based on a particular code sequence. The code sequence can specify variations in pulses within the pulse chain used during signal transmission. By using the code sequence, the pulses produce diverse waveforms that can be distinguished during signal processing from other potential RF signals propagating in the environment. For instance, the code sequence may alter the ramp direction and/or the phase shift for each pulse in the pulse chain, among other transmission parameter adjustments. In some examples, the code sequence can modify multiple transmission parameters, such as the frequency, timing, waveform (e.g., pulse profile and pulse width), spatial resolution, and timing (e.g., carrier period, pulse repetition frequency), among others. As such, applications can involve using all or a subset of these dimensions to distinguish potential interference from the desired reflections of radar signals transmitted by the vehicle radar system.

Within examples, the code sequence used for signal transmission can involve a combination of ramp up pulses and ramp down pulses. Adjusting the ramp direction for pulses in the pulse chain can enable emitted radar signals to achieve decorrelation in both range and Doppler dimensions. The code sequence can also adjust the phase code for pulses, which results in different phase shifts for transmitted radar signals. Shifting the phase on a pulse-to-pulse basis can further distinguish desired reflections from other RF signals in the environment. In some examples, the emitter (e.g., the radar unit) can have a MIMO transmission arrangement that allows a spatial code within the code sequence to further increase decorrelation in the spatial dimension.

In some embodiments, the transceiver chain is augmented to enable waveform diversity. For instance, the transceiver chain can further include an onboard code book for storing code sequence, a direct digital synthesizer (DDS) capable of ramp-to-ramp sign modulation, a transmit phase shifter for ramp-to-ramp phase modulation, and a demodulator processing block in the digital processor for code demodulation. In addition, the emitter can also use a MIMO transmission array to gain an additional degree of freedom in the spatial domain. While the sign and phase codes provide waveform diversity in the range dimension and the Doppler dimension, respectively, spatial codes can be further used across the transmission antenna apertures by adjusting the transmit phase from each of the transmitters. As an example result, the transceiver architecture can provide interference mitigation for three orthogonal measurement dimensions.

In some embodiments, a central system may provide operations to a fleet of vehicles to coordinate radar operations in a way that minimizes interference. For instance, the central system may determine and distribute code sequences for vehicles to use. The code sequences can be orthogonal to each other and distributed based on locations of the vehicles, which reduces potential interference between emitters. In some implementations, the system may use a random generator to increase diversity of pulses within each code provided to a vehicle. As an example, the system can receive seeds from multiple vehicles and input each seed into a random code generator to produce multiple random codes. Each vehicle may generate and provide a seed that can be used by the system to produce random codes that conveys The system may then input the random codes into an orthogonal code generator configured to generate code sequences that have orthogonal codes, which further mitigates interference. In some examples, the seed may indicate a location of a vehicle, which can be used when distributing code sequences with orthogonal codes to vehicles in the same general location.

The following detailed description may be used with one or more radar units having one or multiple antenna arrays. The one or multiple antenna arrays may take the form of a single-input single-output (SISO), single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An antenna array may involve a set of multiple connected antennas that can work together as a single antenna to transmit or receive signals. By combining multiple radiating elements (i.e., antennas), an antenna array may enhance the performance of the radar unit used in some embodiments. In particular, a higher gain and narrower beam may be achieved when a radar unit is equipped with one or more antenna arrays. Antennas on a radar unit may be arranged in one or more linear antenna arrays (i.e., antennas within an array are aligned in a straight line, arranged in planar arrays (i.e., antennas arranged in multiple, parallel lines on a single plane), and/or multiple planes resulting in a three dimensional array. A radar unit may also include multiple types of arrays (e.g., a linear array on one portion and a planar array on another portion).

In some examples, a radar unit may use antenna arranged into antenna channels. Each channel may have its own amplifier and/or analogue-to-digital converter (ADC) and can be operated independently from the other antenna channels. The antennas in each channel may also be referred to as radiating apertures and can be aligned in a specific arrangement, such as a linear array. For instance, a radar unit may include 20 or more antenna channels with each channel consisting of four to 10 antennas arranged in a linear array. The radiating apertures in the channel can then be power combined passively and connected to either an amplifier or ADC.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX® or LTE®. Alternatively, wireless communication system 146 may communicate with a wireless local area network (WLAN) using Wi-Fi® or other possible connections. Wireless communication system 146 may also communicate directly with a device using an infrared link, Bluetooth®, or ZigBee®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth® and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
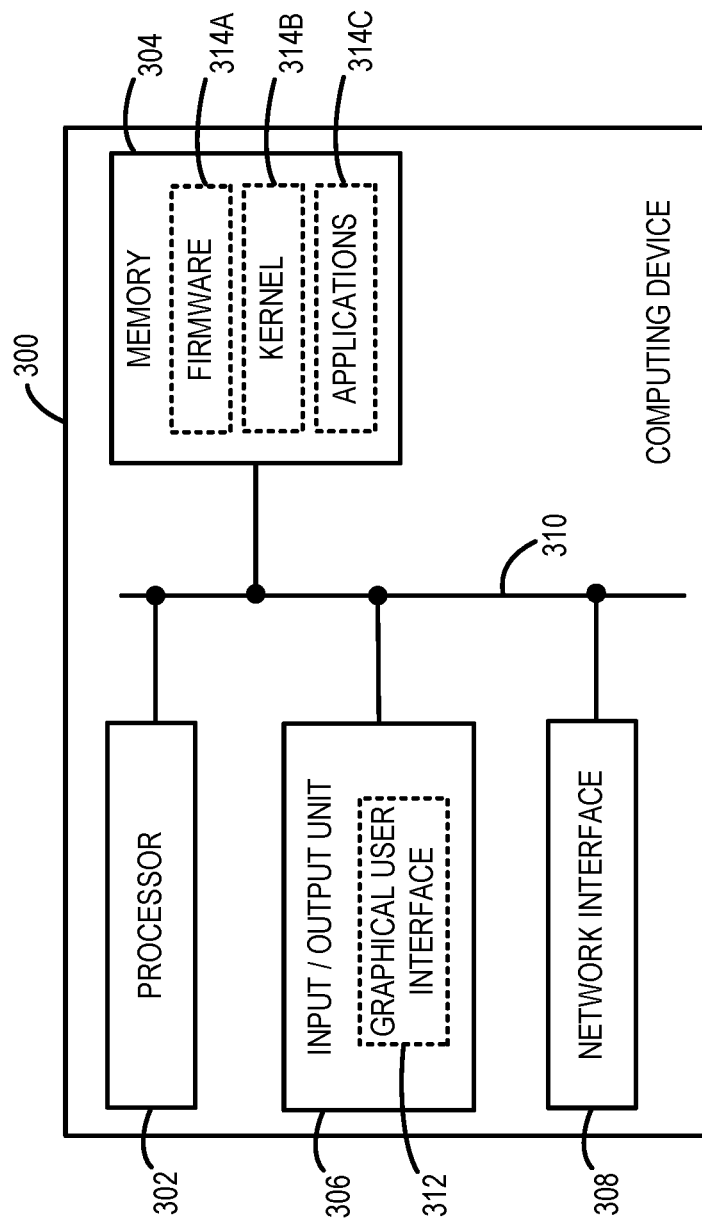
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wi-Fi®), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wi-Fi® interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Figure 4:
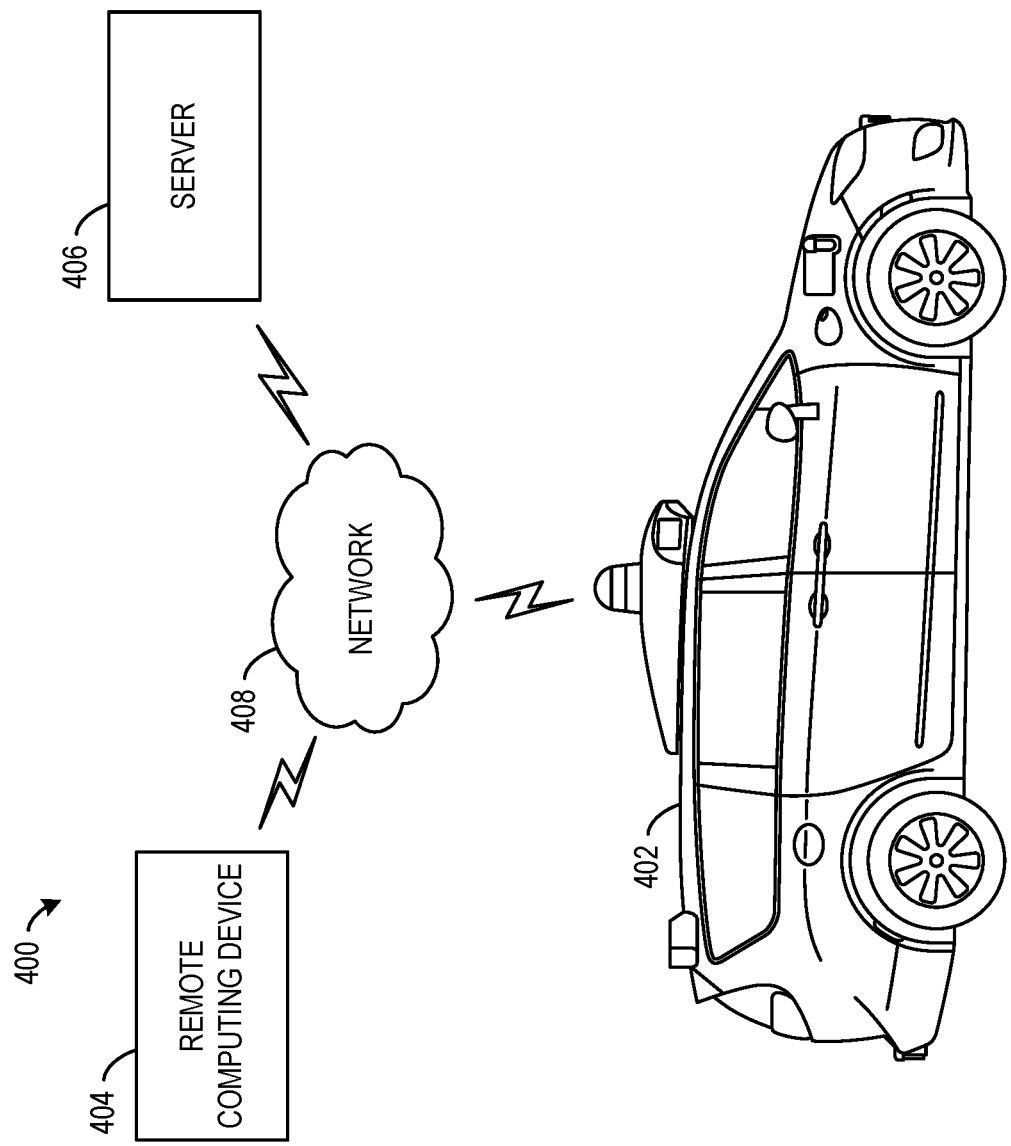
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network.

In some embodiments, vehicle 402 may communicate with remote computing device 404 and/or server 406 via network 408 to receive and/or provide information related to waveform diversity techniques described herein. For instance, server 406 may communicate different code sequences to vehicle 402 for use by its vehicle radar system.

Some vehicle radar systems transmit signals with frequency modulated continuous wave (FMCW) waveforms. By using chirps (i.e., pulses), a radar unit can emit FMCW radar signals that each have a waveform that resembles a complex sinusoid with a frequency that increases linearly with time t∈ [0, T] in accordance with equation 1:

$$f_T(t) = f_c + \frac{B}{T}t \tag{1}$$

where B is the signal bandwidth and $f_c$ is the carrier frequency. In practice, a FMCW radar transmits chirps in a periodic manner with each period referred to as a pulse repetition interval (PRI). FMCW waveforms enable large time-bandwidth products that can be processed via computational-inexpensive processing techniques, such as stretch processing. The reflection of a FMCW waveform signal off a surface (e.g., a target echo) received by a receiver contains a delayed and attenuated copy of the transmitted chirp. For instance, for a target located at range R and moving with radial speed of v, the delay associated with the received reflection can be determined using equation [2] as follows:

$$T = \frac{2(R + vt)}{c} \tag{2}$$

where time t extends across multiple periods and c is the speed of light. The received signal can then be mixed with the transmitted chirp, which produces a complex sinusoid that can be referred to as the beat signal. The beat signal's frequency can be represented as follows:

$$f_b = f_R + f_D \tag{3}$$

Based on the frequency of the beat signal conveyed in equation 3, the range frequency (equation 4) and the Doppler frequency (equation 5) can further be expressed, respectively, as follows:

$$f_R = 2RB/T_c \tag{4}$$

$$f_D = (2v/c)f_c \tag{5}$$

The beat signal can be obtained from the RF domain via the application of a mixer and a filter (e.g., a band pass filter (BPF)) in some examples. In particular, the mixer can be used to combine the received signal with the transmitted chirp to create the beat signal while the filter can be applied to remove any signals that have frequencies that fall outside the desired band of interest. The filter can reduce interference by filtering the frequencies outside the frequency associated with the transmitted signal. In some implementations, a range matched filter is used in the analog domain to remove the signals with frequencies outside the desired band. The beat signal can then be sampled to estimate the beat signal frequency in the digital domain. For instance, an ADC can be used to sample the beat signal to enable the beat signal frequency to be estimated.

For signal processing, fast time represents the time over one period while slow time represents time in steps equal to the period. Because the Doppler frequency is significantly smaller than the range frequency, a processing system can hold the Doppler frequency as constant within each chirp when determining the range frequency. As an example result, the processing system can apply one or more Fast Fourier Transforms (FFTs) on the sampled beat signal along fast time to identify the range frequency and use the range frequency to determine a target's range as follows:

$$R = \frac{cf_R T}{2B} \tag{6}$$

The processing system can also apply one or more FFTs operation along slow time to obtain the target's Doppler frequency. During application of FFTs along slow time, the processing system may hold the range frequency as constant across slow time. The application of FFTs by the processing system to extract the range frequency and the Doppler frequency can be implemented as a two-dimensional (2D) FFT in some examples. In practice, the 2D FFT can be applied to the sampled beat signal in both fast time and slow time to produce a range-Doppler spectrum of the environment, also referred to as 2D range-Doppler map of the environment.

Range and Doppler detection can then be implemented by applying a threshold-based technique to the range-Doppler spectrum determined above. For instance, the processing system can be a constant false alarm rate (CFAR) detector. The 2D FFT and subsequent processing enables separation of the targets in the environment according to the range and Doppler domain. In addition, the processing system can also identify angles for objects via one or more sparse sensing techniques (e.g., compressive sensing) with the number of targets within the same range-Doppler bin being usually small when moving. As such, these operations for frequency estimation can be computed with low-cost digital signal processors (DSPs) or field programmable gate arrays (FPGAs) in some examples.

In some implementations, automotive radars typically use pulse trains of identically modulated pulses that are typically Linear Frequency Modulated (LFM) or FMCW. On receive, a computing system may process the return through fast-time and slow-time compression to localize targets in range and Doppler dimensions, respectively. For instance, a simplified transceiver chain for a single channel FMCW pulse-train that yields a range-Doppler imagery of the scene can include a direct digital synthesizer (DDS) for Digital-to-Analog conversion, a stretch processor on receive, and a digital processor for range-Doppler image formation.

RF interference can represent undesired electromagnetic interference that occurs within the RF spectrum from 30 Hz to 300 GHz. For radar architecture implemented for some vehicle radar systems, the operational RF spectrum of interest may lie in the neighborhood of 76 GHz to 81 GHz, but the operational RF spectrum of interest can differ for radar systems in other examples. Interference can cause undesirable effects during operation of a radar system, such as radar measurement denial, false target detections, false target tracks, degradation (e.g., increase) of the noise floor, and masking of smaller nearby true targets. In general, multiple sources of interference may be simultaneously observed with differing geometries and waveforms.

One existing technique used to reduce RFI involves centrally planning and distributing frequencies to different vehicles located in the general geographical location. In practice, the central planner can assign different frequency channels to each vehicle to help reduce potential interference when these vehicles are operating in the same location. As an example result, the vehicle radar systems can reduce RFI caused by each other.

Figure 5:
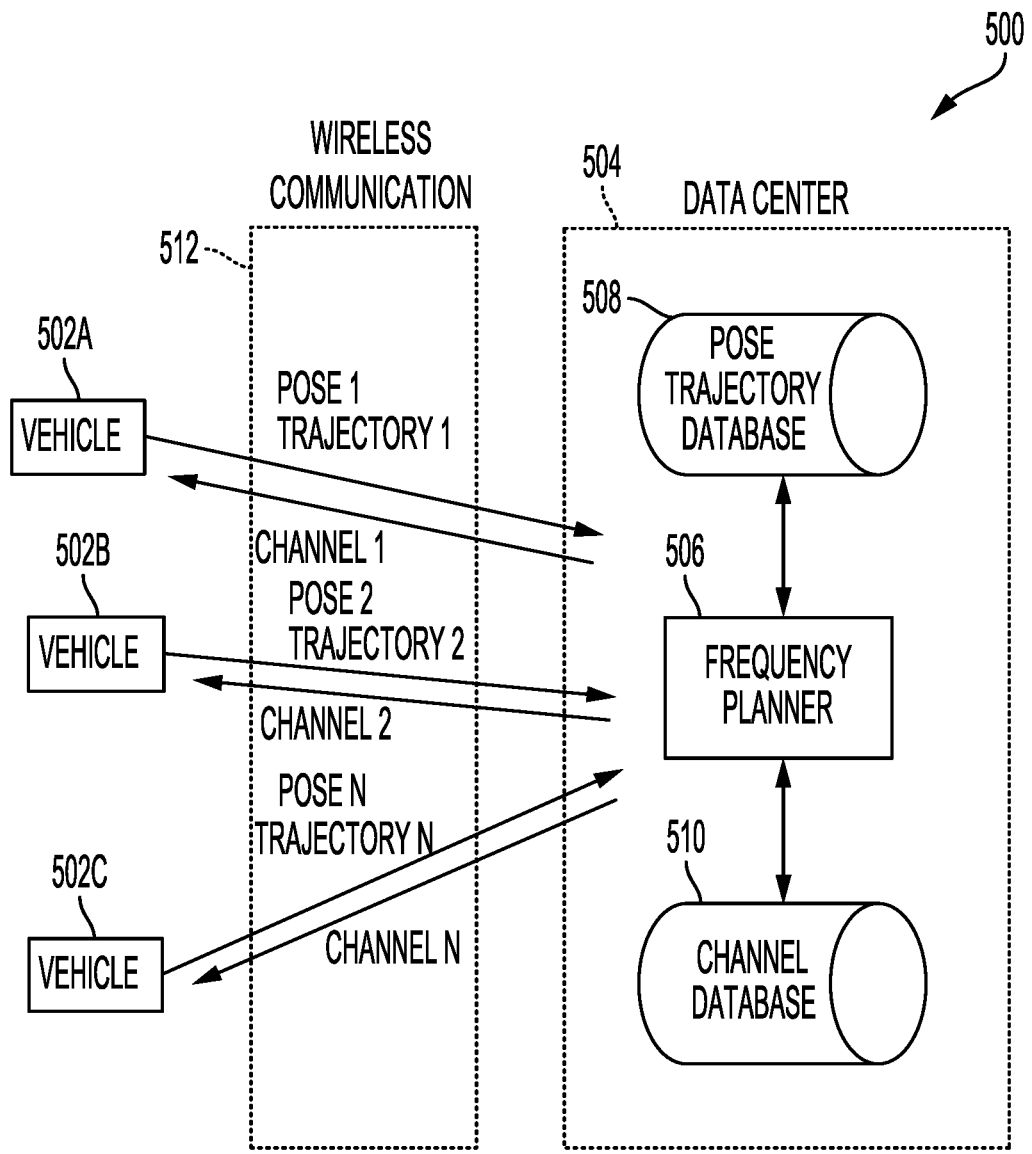
FIG. 5 is a simplified block diagram of a system for centralized frequency planning, according to one or more example embodiments.

FIG. 5 shows a simplified block diagram of system 500 configured for centralized frequency planning. In the example embodiment, system 500 is configured to plan and assign different frequency channels to vehicles (e.g., vehicle 502A, vehicle 502B, and vehicle 502C) in wireless communication 512 with system 500 in order to reduce interference between the vehicle radar systems used by the vehicles. In near real-time, system 500 can monitor vehicle locations and assign mutually exclusive frequency to vehicles that are located within a threshold physical proximity from each other, which can help reduce RFI between vehicles within the fleet.

In practice, system 500 can include one or more computing systems operating within data center 504. These computing systems can implement frequency planner 506, which may use information from pose trajectory database 508 to review locations of vehicles and/or other types of RF emitters coordinating with system 500. For instance, system 500 can be used to help coordinate vehicles within the fleet that are currently positioned nearby each other and/or may encounter the same area based on current routes and traffic conditions. In the example shown in FIG. 5, frequency planner 506 may use pose trajectory database 508 to determine that vehicle 502A, vehicle 502B, and vehicle 502C are positioned in the same general location (e.g., within a threshold proximity relative to each other) and provide a different frequency channel for each vehicle to subsequently use. In practice, each vehicle 502A-502C may communicate its pose and trajectory to frequency planner 506, which in turn identifies and communicates a frequency channel for use by the vehicle's radar system. To monitor frequency channels available for different locations, frequency planner 506 may use channel database 510 that can organize the different frequency channels currently assigned to vehicles at given locations.

Although system 500 can distribute different frequency channels, this solution is limited by some engineering challenges, such as scarcity in the operating spectrum, synchronization between radar systems, and scalability. In practice, as transmitted bandwidth requirements increase, the available channels in the automotive frequency band decrease. Thus, system 500 is limited on the different channels available to assign to vehicles. In addition, in order to have predictable frequency occupancy, system 500 may have to use a tight timing requirement when synchronizing radars within a fleet to operate within their corresponding channels. Further, as fleet size increases, system 500 can become inefficient and harder to scale.

Example diversity waveform techniques presented herein can be used to resolve or relax the engineering challenges enumerated above. In the case when a radar system actively radiates in environments polluted by other interfering radars with similar waveforms, a transceiver architecture might not be able to differentiate between desired backscatter and RF interference transmission. The outcome can result in depressed SNR, false detection and corrupted imagery from the scene as interference overwhelms actual radar return.

Figure 6:
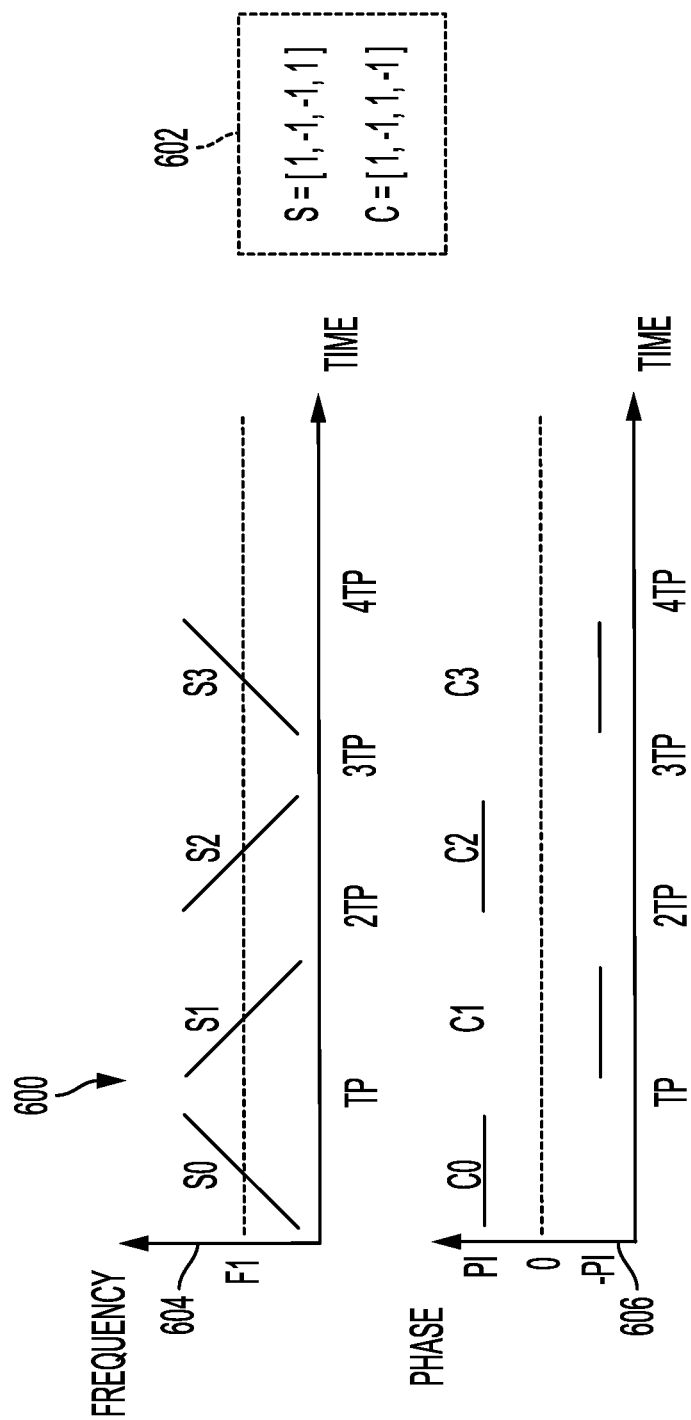
FIG. 6 depicts a pulse-to-pulse chain for implementing waveform diversity, according to one or more example embodiments.

To further illustrate, FIG. 6 depicts pulse chain 600 for implementing pulse-to-pulse waveform diversity. A vehicle radar system or another type of emitter may transmit signals according to pulse chain 600, which involves fast and slow-time modulation in ramp direction and phase shifts on a pulse-to-pulse basis, respectively. These modulations are specified by a code sequence 602 that conveys waveform parameters for four consecutive pulses used for signal transmission. In particular, each pulse has a ramp direction represented by a sequence of sign codes ($s=\{1, -1, -1, 1\}$) in code sequence 602. As shown in ramp direction graph 604, the first pulse and fourth pulses have a positive ramp direction (positive chirp) while the second and third pulses have a negative ramp direction (negative chirp). Other patterns can be implemented based on the sign codes specified in the particular code sequence used for signal transmission.

In addition, phase shift graph 606 conveys the different phase shifts implemented according to the sequence of phase codes (c={1, −1, 1, −1}) across pulses conveyed in code sequence 602. The example phase code represents a sequence of angles, respectively 0 degrees, 180 degrees, 0 degrees, and 180 degrees and can be described as having 2 alphabets ({0, 180}). As such, the example phase code is included for illustration purposes and can differ within other examples. For instance, the phase shifts can be arbitrary. The orthogonalization process used to create signal diversity can generate code sequences that can include additional alphabets. As an example, a computing device can output orthogonal codes that contain four alphabets composed of angles {0, 90, 180, 270}. In addition, as shown in phase shift graph 606, the phase is positive for the first and third pulses and negative for the second and fourth pulses. The arrangement of pulse chain 600 represents an example pattern that "diversifies" emitted signals with different waveform parameters across four example pulses.

Code sequence 602 can represent waveform parameters for other numbers of pulses and may be repeated during different time cycles. For instance, code sequence 602 can convey parameters across dozens or hundreds of pulses and may be repeated every ten seconds or another duration of time. Other examples can involve different patterns of parameters across pulses within a code sequence used by an emitter.

Figure 7:
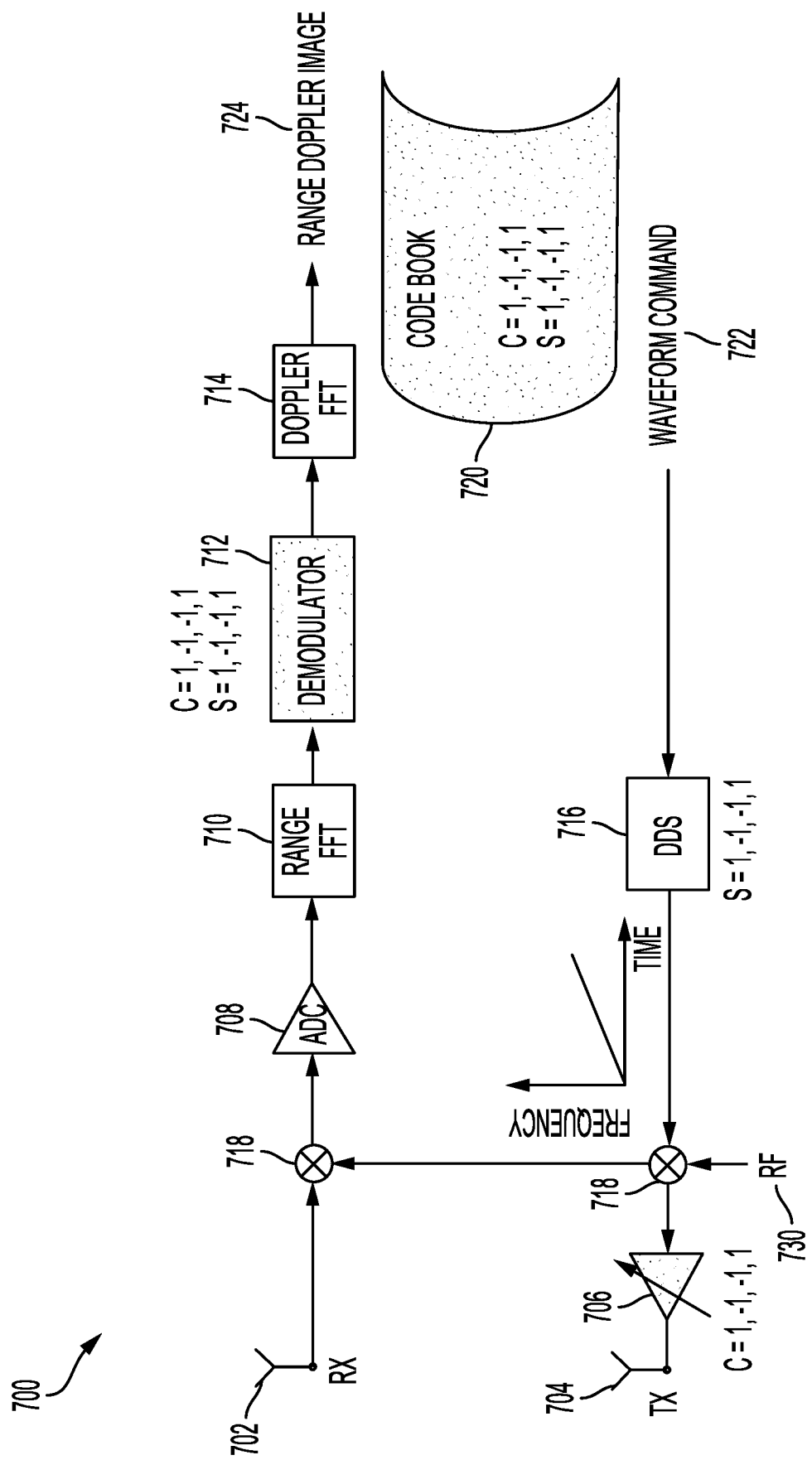
FIG. 7 depicts a block diagram of a radar transceiver configured for waveform diversity, according to one or more example embodiments.

FIG. 7 a block diagram of radar transceiver 700 configured for waveform diversity. In the example embodiment, radar transceiver 700 includes receive antenna 702, transmit antenna 704, transmit phase shifter 706, ADC 708, range FFT 710, demodulator 712, Doppler FFT 714, DDS 716, mixers 718, and code book 720. Transceiver chain 700 is configured to actualize both the sign and phase codes during signal transmission and processing. In other embodiments, radar transceiver 700 can have a different configuration with more or fewer components.

Radar transceiver 700 initiates transmission with waveform command 722. DDS 716 receives waveform command 722 and performs ramp-to-ramp sign modulation based on code book 720. RF 730 is mixed with the output from DDS 716, which is then input to transmit phase shifter 706 that shifts the phase of each pulse based on code book 720 for subsequent transmission by transmit antenna 704. Receive antenna 702 receives a reflection of a transmitted signal, which is mixed with an attenuated copy of the transmitted chirp by mixer 718 to produce a beat signal. ADC 708 may then sample the beat signal to enable the beat signal frequency to be estimated. Radar transceiver 700 further applies range FFT 710, demodulator 712, and Doppler FFT 714 to the sampled beat signal to output range doppler image 724. Demodulator 712 can involve a digital processor configured for code demodulation in some examples. As such, radar transceiver 700 can be used by a radar unit for chirp and phase diversity coding that enables waveform diversity.

Figure 8:
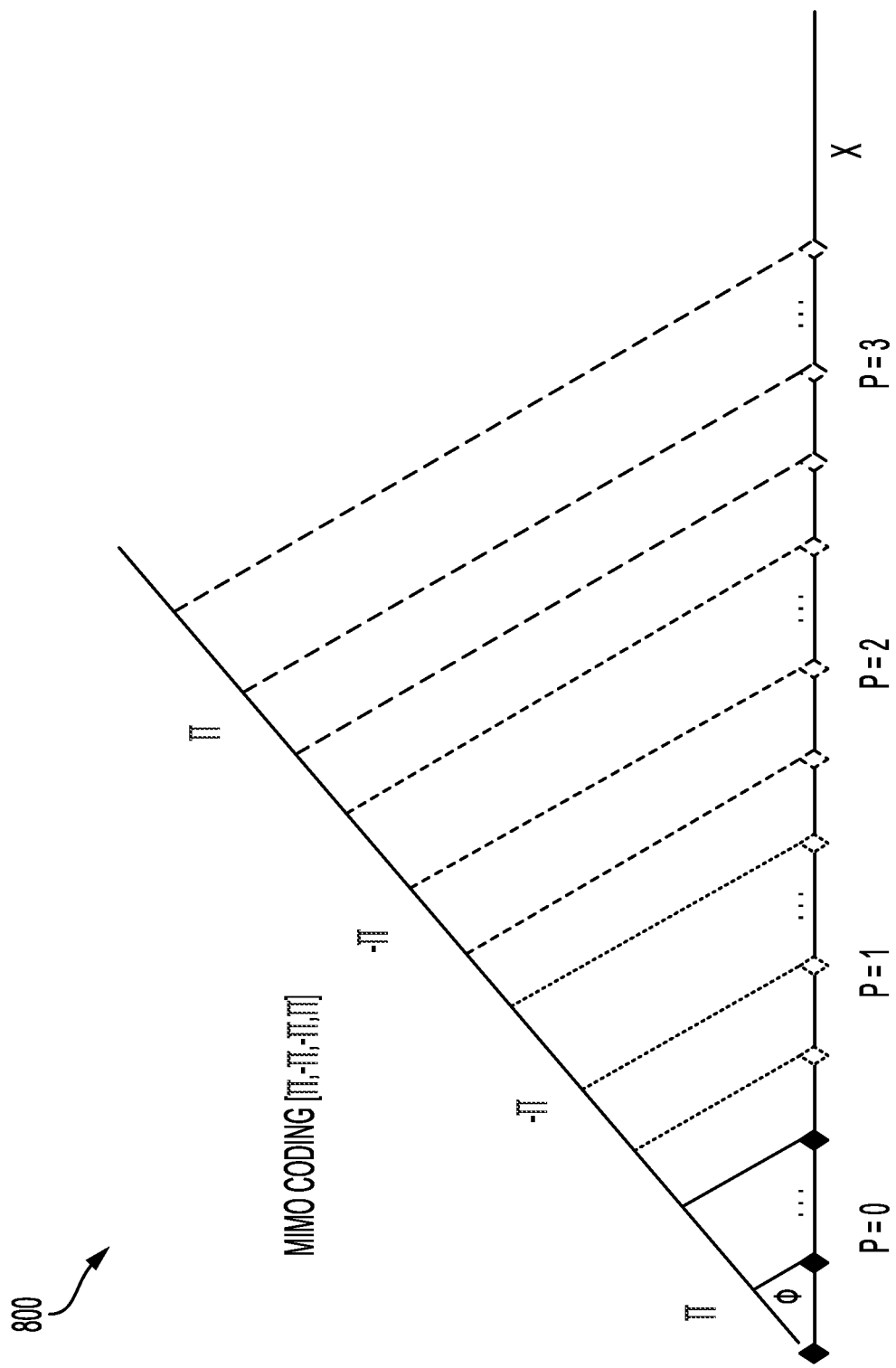
FIG. 8 depicts a graph representing multiple input multiple output (MIMO) coding, according to one or more example embodiments.

FIG. 8 depicts a graph representing MIMO coding 800. In some embodiments, the radar system can have apertures arranged in a MIMO formation and use MIMO coding 800 to gain an additional degree of freedom in the spatial domain. While the sign and phase codes provide waveform diversity in range and Doppler space, respectively, spatial codes can be implemented across the transmission antenna apertures by adjusting the transmit phase from each of the transmitters.

MIMO coding 800 is illustrated with the virtual array constituted by stitching across four transmission apertures from an example MIMO system, where the sub-apertures are coded with a spatial phase code from each of the 4 transmission antenna apertures. To overlay MIMO spatial codes for interference mitigation, radar transceiver 700 shown in FIG. 7 may be further augmented with a MIMO system that enables range-Doppler-angle diversity demodulation.

Figure 9:
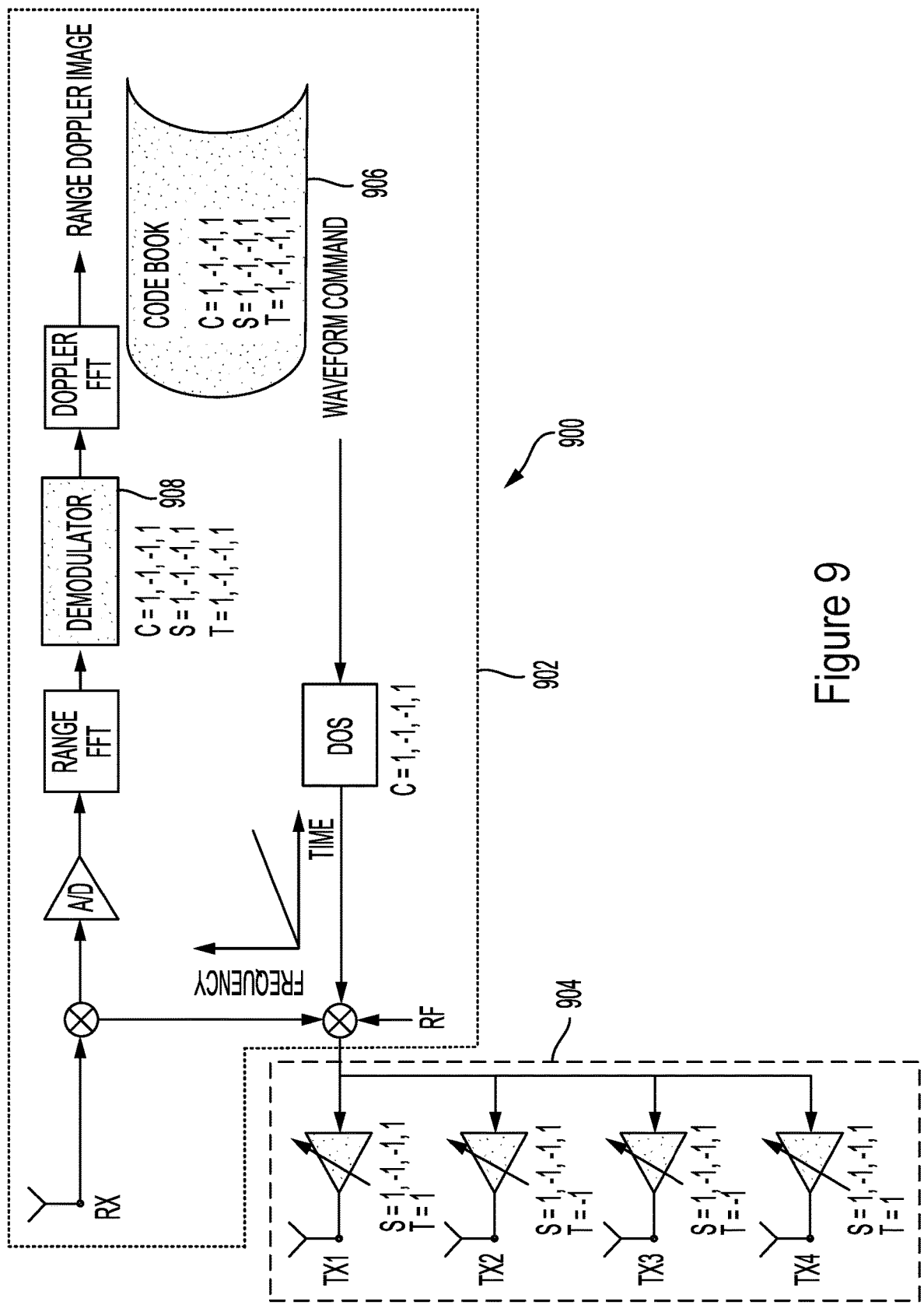
FIG. 9 depicts a block diagram of a radar transceiver configured for range-Doppler-angle imaging, according to one or more example embodiments.

FIG. 9 depicts a block diagram of radar transceiver 900, which is configured for range-Doppler-angle imaging. In the example embodiment, radar transceiver 900 includes components 902 similar to radar transceiver 700 shown in FIG. 7. The configuration of radar transceiver 900 differs by further including multiple transmit antennas 904. Each transmit antenna may represent one or multiple antennas (e.g., an antenna channel) and can be used to further enhance interference mitigation by implementing spatial code according to code book 906. In addition, each transmit antenna 904 includes a transmit phase shifter to transmit phase shift of emitted signals based on the code sequence specified by the code book 906. The transmit phase shifters can be coded with a spatial code using a similar mechanism as the slow-time phase code. As further shown in FIG. 9, demodulator 908 can further demodulate received signals based on the spatial code conveyed in code book 906.

For a MIMO system, multiple transmitters can provide superior angular resolution by extending the size of the antenna baseline. On receive, the returns from different transmitters are separated through one or more techniques, such as Code Division Multi-access (CDMA), FDMA, or TDMA. The transmit phase shifters can module each of the transmitters with an arbitrary phase code that can be demodulated with a priori knowledge of the code sequence, which enables a MIMO virtual aperture to be reconstructed. The transmissions that originated from other emitters (e.g., other vehicles) would not share the same code sequence. As such, demodulator 908 can scramble these transmissions received at radar transceiver 900, which results in a scrambled virtual aperture that will not cohere after angle matched filtering.

Figure 10A:
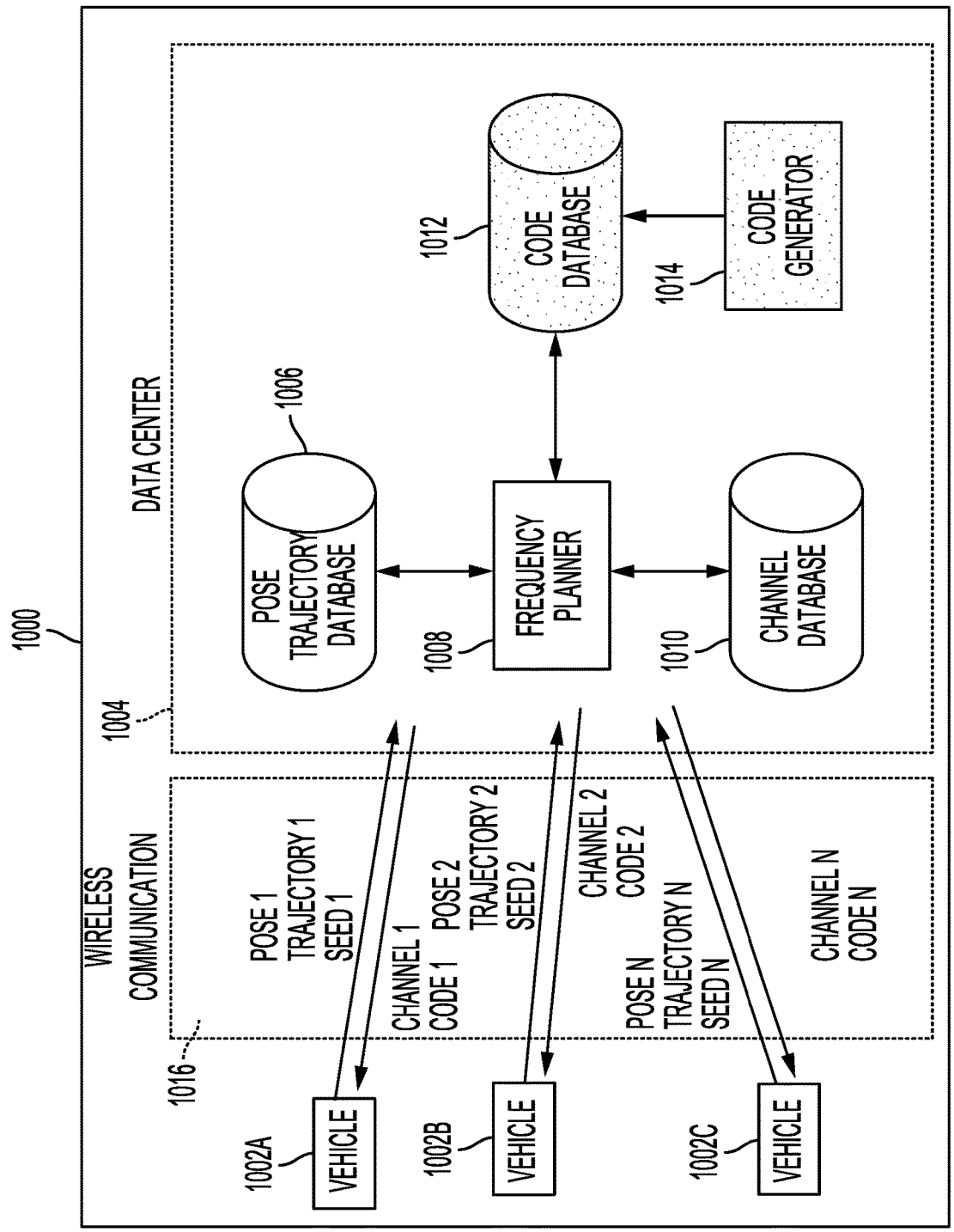
FIG. 10A is a block diagram of a system for centralized frequency planner with code distribution, according to one or more example embodiments.

FIG. 10A is a block diagram of a frequency planner system with code distribution. In the example embodiment, system 1000 can involve frequency planner 1008. System 1000 is similar to the centralized frequency planner system illustrated in FIG. 5 and further includes additional components that allow allocation of waveform diversity codes beyond the existing frequency allocation feature. In particular, system 1000 is shown with datacenter 1004 implementing frequency planner 1008, pose trajectory database 1006, and channel database 1010. System 1000 may also communicate for disclosed waveform diversity techniques with vehicle 1002A, vehicle 1002B, and vehicle 1002C via wireless communication 1016. System 1000 further includes code database 1012 and code generator 1014 to enable implementation of radar diversity techniques.

As an example, each vehicle 1002A-1002C may provide a unique identifier referred to herein as a seed to system 1000 via wireless communication 1016. The seed provides information about the vehicle for use by frequency planner 1008. For instance, the seed may indicate a status of the vehicle, a location and a pose of the vehicle, a current or future route of the vehicle, and/or a type of vehicle radar system (or a general sensor system), among other information. In some implementations, each vehicle 1002A-1002C may provide the seed to frequency planner 1008 upon a transition from an inactive state (e.g., vehicle off or not navigating) to an active state (e.g., power on or initiation of a route). In some cases, a vehicle may provide the seed in response to receiving a new ride request from a passenger. In return, frequency planner 1008 may use the seeds and assign a set of generated waveform diversity codes (e.g., chirp, phase and spatial) that enable waveform diversity and reduce interference. In particular, frequency planner 1008 may use code database 1012 and code generator 1014 to provide diverse code sequences to vehicles 1002A-1002C. In some examples, frequency planner 1008 may periodically transmit new diverse code sequences to vehicles 1002A-1002C, which suppresses interference.

Figure 10B:
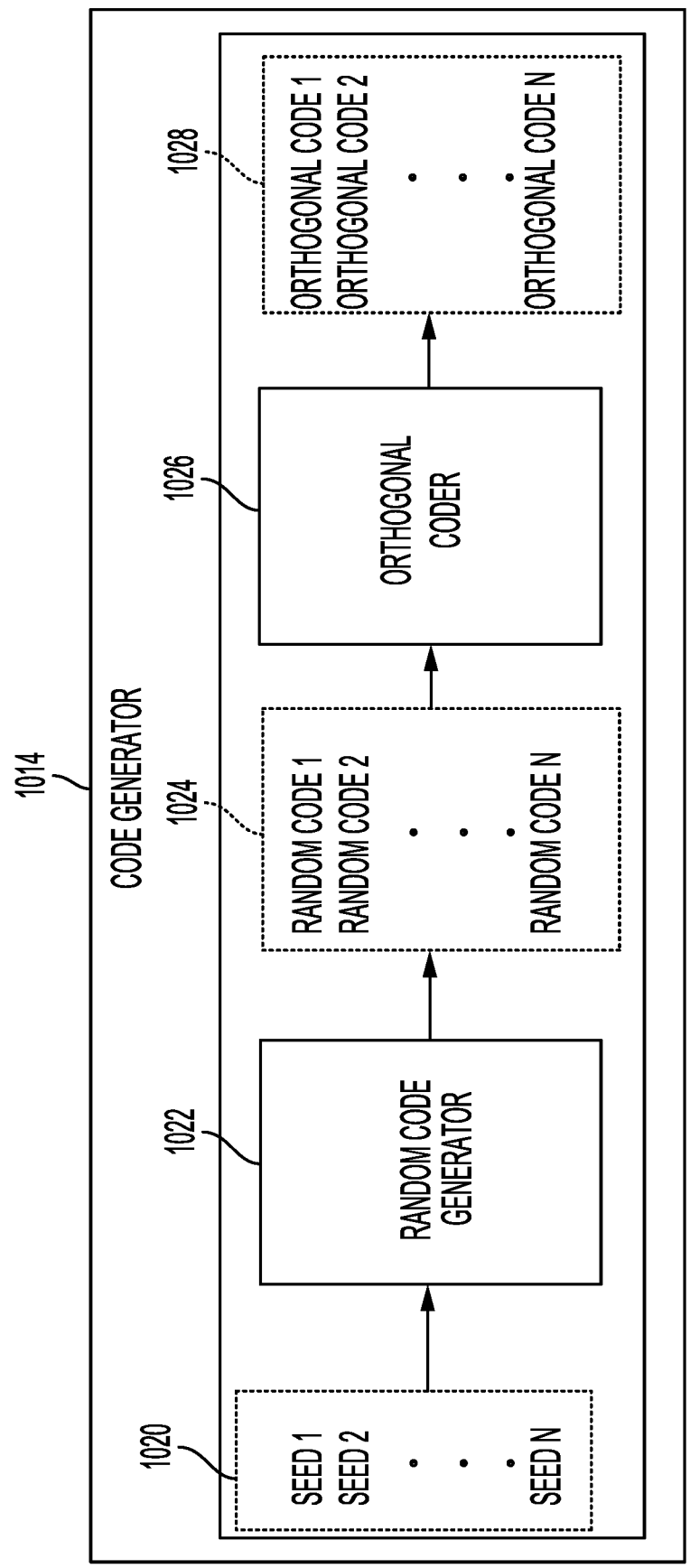
FIG. 10B is a block diagram of the code generator, according to one or more example embodiments.

FIG. 10B is a block diagram of code generator 1014, which operates as part of system 1000. In particular, code generator 1014 is configured to receive seeds 1020, which are provided to frequency planner 1008 by vehicles (e.g., vehicle 1002A-1002C). Seeds 1020 are input into random code generator 1022, which outputs random codes 1024. Random code generator 1022 generates code families in some examples. Code generator 1014 then inputs random codes 1024 into orthogonal coder 1026, which is configured to output orthogonal code sequences 1028 that can be stored in code database 1012. In some instances, orthogonal coder 1026 takes initial code families generated by random code generator 1022 and projects each code such that they are pairwise orthogonal to each other and minimize their cross-correlation. Frequency planner 1008 uses orthogonal code sequences 1028 to assign code sequences to vehicles that mitigate interference.

Figure 11:
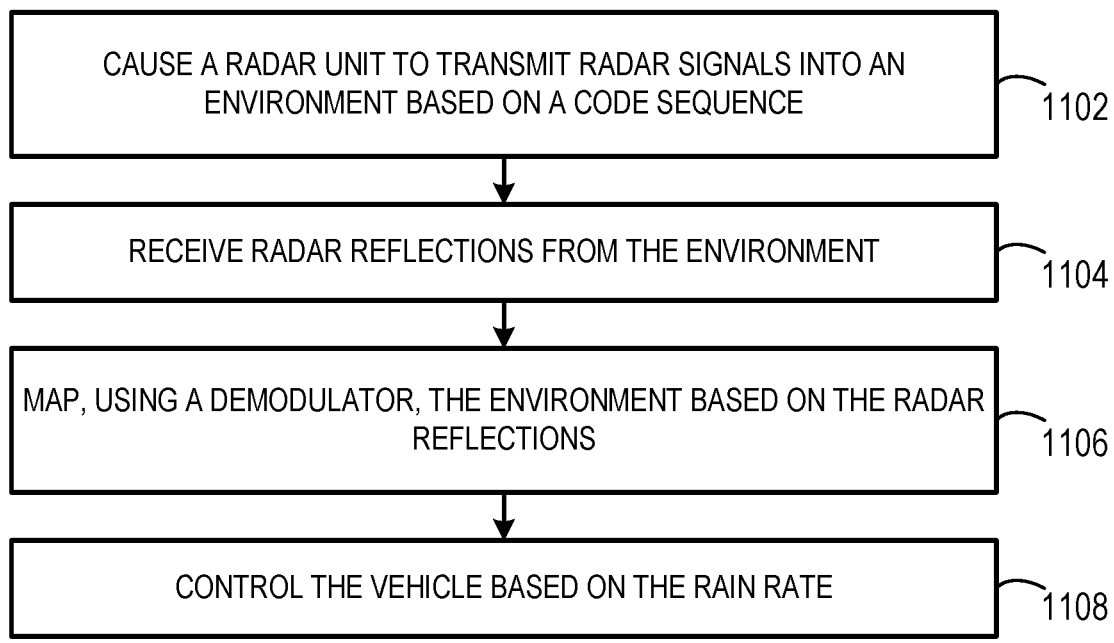
FIG. 11 is a flow chart of a method for implementing radar waveform diversity, according to example embodiments.

FIG. 11 is a flow chart of a method for implementing radar waveform diversity. Method 1100 may include one or more operations, functions, or actions, as depicted by one or more of block 1102, block 1104, block 1106, and block 1108, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Block 1102 of method 1100 involves causing a radar unit to transmit radar signals into an environment based on a code sequence. Particularly, the code sequence can indicate a ramp direction and a phase shift for each pulse in a pulse chain used by the radar unit for radar signal transmission. For instance, the computing device may cause the radar unit to transmit radar signals based on positive ramp directions and negative ramp directions associated with respective pulses in the pulse chain. The computing device can also cause the radar to transmit radar signals based on positive phase shifts and negative phase shifts associated with respective pulses in the pulse chain. The radar unit can transmit FMCW radar signals based on the code sequence. In some examples, the phase shifts can be arbitrary and involve different adjustments.

In some embodiments, the radar unit includes multiple transmission antennas. As such, the code sequence can further indicate spatial codes associated with respective pulses in the pulse chain. The computing device can cause the radar unit to transmit radar signals using the multiple transmission antennas based on the spatial codes associated with respective pulses in the pulse chain.

The radar unit can be one or multiple coupled to a vehicle. For instance, the radar unit can be a forward-facing radar unit that has a field of view of the forward environment positioned in front of the vehicle. As such, a first radar unit can transmit radar signals into a first portion of the environment based on a first code sequence and a second radar unit can transmit radar signals into a second portion of the environment based on a second code sequence. The first portion and the second portion of the environment can overlap in some instances. In addition, in some cases, the first code sequence and the second code sequence are different. This can enable the processing system to differentiate incoming reflections received as the vehicle adjusts pose relative to the environment during navigation.

Block 1104 of method 1100 involves receiving radar reflections from the environment. The radar unit may include one or multiple reception antennas.

Block 1106 of method 1100 involves mapping, using a demodulator, the environment based on the radar reflections. The demodulator can perform code demodulation techniques on received signals. For instance, mapping can involve demodulating a sample of a radar reflection based on the code sequence.

Mapping the environment can involve determining a 2D range Doppler map based on the radar reflections. In particular, the demodulator can output radar data less impacted by interference due to diversity in the waveforms transmitted by the radar system when compared to other emitters in the area.

Block 1108 of method 1100 involves controlling the vehicle based on mapping the environment. For instance, vehicle systems can detect objects and aspects of the environment via the radar measurements in a 2D range Doppler map data, which can enable the control system to navigate the environment safely.

In some embodiments, the computing device can provide a seed to a remote computing system, which can be configured to receive respective seeds from a plurality of vehicles and input each seed into a random code generator to produce a plurality of random codes. The remote computing system can be further configured to input the plurality of random codes into an orthogonal code generator configured to generate respective code sequences having orthogonal codes. The computing device on the vehicle can receive the code sequence from the remote computing system based on providing the seed to the remote computing system.

In some examples, the computing device can generate the seed based on the vehicle transitioning to an active state from an inactive state (e.g., power on after being off). The seed can indicate an identification for the vehicle and a current location of the vehicle and then provide the generated seed to the remote computing system. In some cases, the computing device may determine a route for the vehicle to navigate and generate the seed such that the seed further indicates data representing the route responsive to determining the route. As an example, the vehicle includes a first radar unit and a second radar unit and the computing device may receive a first code sequence for use by the first radar unit and a second code sequence for use by the second radar unit.

Figure 12:
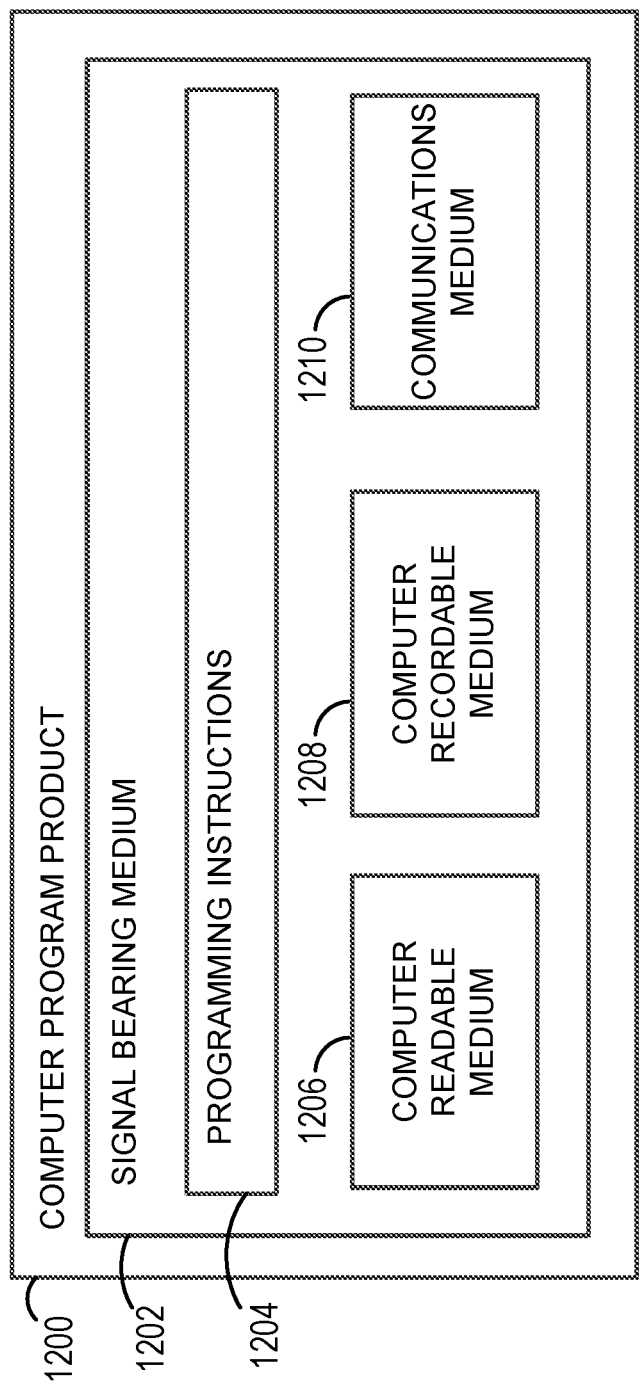
FIG. 12 is a schematic diagram of a computer program, according to example implementations.

FIG. 12 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 1200 is provided using signal bearing medium 1202, which may include one or more programming instructions 1204 that, when executed by one or more processors may provide functionality or portions of the functionality described above with respect to FIGS. 1-11. In some examples, signal bearing medium 1202 may encompass a non-transitory computer-readable medium 1206, such as, but not limited to, a hard disk drive, a Compact Disc (CD), a Digital Video Disk (DVD), a digital tape, memory, etc.

In some implementations, signal bearing medium 1202 may encompass computer recordable medium 1208, such as, but not limited to, memory, read/write (R/W) CDs, R/W DVDs, etc. In some implementations, signal bearing medium 1202 may encompass communications medium 1210, such as, but not limited to, a digital and/or an analog communication medium (e.g., a fiber optic cable, a waveguide, a wired communications link, a wireless communication link, etc.). Thus, for example, signal bearing medium 1202 may be conveyed by a wireless form of communications medium 1210.

One or more programming instructions 1204 may be, for example, computer executable and/or logic implemented instructions. In some examples, a computing device such as computer system 112 of FIG. 1 may be configured to provide various operations, functions, or actions in response to programming instructions 1204 conveyed to computer system 112 by one or more of computer-readable medium 1206, computer recordable medium 1208, and/or communications medium 1210. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
 causing, by a computing device positioned on a vehicle, a first radar unit to transmit radar signals into an environment based on a first code sequence and a second radar unit to transmit radar signals into the environment based on a second code sequence, wherein each code sequence indicates a ramp direction and a phase shift for each pulse in a pulse chain used by the first radar unit or the second radar unit for radar signal transmission, and wherein the first code sequence and the second code sequence are different;
 receiving, by the computing device and from the first radar unit and the second radar unit, radar reflections representing the environment;
 mapping, by the computing device using a demodulator, the environment based on the radar reflections; and
 controlling the vehicle based on mapping the environment.

2. The method of claim 1, wherein causing the first radar unit to transmit radar signals into the environment comprises:
 causing the first radar unit to transmit radar signals based on positive ramp directions and negative ramp directions associated with respective pulses in the pulse chain.

3. The method of claim 1, wherein causing the first radar unit to transmit radar signals into the environment comprises:
 causing the first radar unit to transmit radar signals based on positive phase shifts and negative phase shifts associated with respective pulses in the pulse chain.

4. The method of claim 1, wherein each radar unit comprises a plurality of transmission antennas, and wherein each code sequence further indicates spatial codes associated with respective pulses in the pulse chain.

5. The method of claim 4, wherein causing the first radar unit to transmit radar signals into the environment comprises:
 causing the first radar unit to transmit radar signals using the plurality of transmission antennas based on the spatial codes associated with respective pulses in the pulse chain.

6. The method of claim 1, wherein mapping, by the computing device using a demodulator, the environment based on the radar reflections comprises:
 demodulating a sample of a radar reflection based on the code sequence.

7. The method of claim 1, wherein causing the first radar unit to transmit radar signals into the environment comprises:
 causing the radar unit to transmit frequency modulated continuous wave (FMCW) radar signals.

8. The method of claim 1, further comprising:
 providing, by the computing device, a seed to a remote computing system, wherein the remote computing system is configured to receive respective seeds from a plurality of vehicles and input each seed into a random code generator to produce a plurality of random codes, and wherein the remote computing system is further configured to input the plurality of random codes into an orthogonal code generator configured to generate respective code sequences having orthogonal codes; and
 receiving at least the first code sequence or the second code sequence from the remote computing system based on providing the seed to the remote computing system.

9. The method of claim 8, wherein providing the seed to the remote computing system comprises:

generating the seed based on detecting the vehicle transitioned to an active state from an inactive state, wherein the seed indicates an identification for the vehicle and a current location of the vehicle; and providing the generated seed to the remote computing system.

10. The method of claim 9, wherein generating the seed further comprising:

determining a route for the vehicle to navigate; and responsive to determining the route, generating the seed such that the seed further indicates data representing the route.

11. The method of claim 8, wherein receiving at least the first code sequence or the second code sequence from the remote computing system comprises:

receiving the first code sequence for use by the first radar unit and the second code sequence for use by the second radar unit.

12. The method of claim 1, wherein the first radar unit and the second radar unit are forward facing radar units positioned at a front portion of the vehicle.

13. A system comprising:

a first radar unit and a second radar unit coupled to a vehicle; and a computing device configured to:

cause the first radar unit to transmit radar signals into an environment based on a first code sequence and the second radar unit to transmit radar signals into the environment based on a second code sequence, wherein each code sequence indicates a ramp direction and a phase shift for each pulse in a pulse chain used by the first radar unit or the second radar unit for radar signal transmission;

receive, from the first radar unit and the second radar unit, radar reflections representing the environment;

map, using a demodulator, the environment based on the radar reflections; and control the vehicle based on mapping the environment.

14. The system of claim 13, wherein each code sequence indicates positive ramp directions and negative ramp directions associated with respective pulses in the pulse chain, and wherein each code sequence further indicates positive phase shifts and negative phase shifts associated with respective pulses in the pulse chain.

15. The system of claim 14, wherein each radar unit comprises a plurality of transmission antennas, and wherein each code sequence further indicates spatial codes associated with respective pulses in the pulse chain.

16. The system of claim 13, further comprising:

a remote computing system; and wherein the computing device is further configured to:

provide a seed to a remote computing system, wherein the remote computing system is configured to receive respective seeds from a plurality of vehicles and input each seed into a random code generator to produce a plurality of random codes, and wherein the remote computing system is further configured to input the plurality of random codes into an orthogonal code generator configured to generate respective code sequences having orthogonal codes; and receive at least the first code sequence or the second code sequence from the remote computing system based on providing the seed to the remote computing system.

17. The system of claim 16, wherein the computing device is further configured to:

determine that the vehicle transitioned to an active state from an inactive state; and generate the seed based on the vehicle transitioning to an active state from an inactive state, wherein the seed indicates an identification for the vehicle and a current location of the vehicle.

18. The system of claim 17, wherein the computing device is further configured to receive the first code sequence for use by the first radar unit and the second code sequence for use by the second radar unit.

19. The system of claim 13, wherein one or more pairs of consecutive pulses in the pulse chain differ in ramp direction and phase shift.

20. A non-transitory computer-readable medium configured to store instructions, that when executed by a computing system comprising one or more processors, causes the computing system to perform operations comprising:

causing a first radar unit to transmit radar signals into an environment of a vehicle based on a first code sequence and a second radar unit to transmit radar signals into the environment based on a second code sequence, wherein each code sequence indicates a ramp direction and a phase shift for each pulse in a pulse chain used by the first radar unit or the second radar unit for radar signal transmission, and wherein the first code sequence and the second code sequence are different;

receiving, from the first radar unit and the second radar unit, radar reflections representing the environment;

mapping, using a demodulator, the environment based on the radar reflections; and controlling the vehicle based on mapping the environment.

* * * * *